United States Patent
Datta et al.

(10) Patent No.: US 7,752,428 B2
(45) Date of Patent: Jul. 6, 2010

(54) SYSTEM AND METHOD FOR TRUSTED EARLY BOOT FLOW

(75) Inventors: Shamanna M. Datta, Hillsboro, OR (US); Vincent J. Zimmer, Federal Way, WA (US); Michael A. Rothman, Puyallup, WA (US)

(73) Assignee: Intel Corporation, Santa Clara, CA (US)

( * ) Notice: Subject to any disclaimer, the term of this patent is extended or adjusted under 35 U.S.C. 154(b) by 1372 days.

(21) Appl. No.: 11/096,832

(22) Filed: Mar. 31, 2005

(65) Prior Publication Data

US 2006/0224878 A1 Oct. 5, 2006

(51) Int. Cl.
*G06F 9/00* (2006.01)

(52) U.S. Cl. .......................................... 713/2; 713/194

(58) Field of Classification Search ...................... 713/2, 713/164, 165, 170, 189, 193, 194, 168, 176, 713/167

See application file for complete search history.

(56) References Cited

U.S. PATENT DOCUMENTS

| | | | |
|---|---|---|---|
| 6,651,171 B1 * | 11/2003 | England et al. ............. | 713/193 |
| 6,907,524 B1 * | 6/2005 | Huntington et al. ......... | 713/164 |
| 6,973,569 B1 * | 12/2005 | Anderson et al. ........... | 713/156 |
| 2003/0126442 A1 | 7/2003 | Glew et al. | |
| 2003/0126453 A1 | 7/2003 | Glew et al. | |
| 2003/0188173 A1 * | 10/2003 | Zimmer et al. .............. | 713/189 |
| 2004/0003321 A1 | 1/2004 | Glew et al. | |
| 2005/0268114 A1 * | 12/2005 | Thibadeau ................... | 713/189 |
| 2008/0077592 A1 * | 3/2008 | Brodie et al. ................... | 707/9 |
| 2009/0055658 A1 * | 2/2009 | Hyser ........................... | 713/189 |
| 2009/0327684 A1 * | 12/2009 | Zimmer et al. .................. | 713/2 |

* cited by examiner

*Primary Examiner*—Beemnet W Dada
(74) *Attorney, Agent, or Firm*—Trop, Pruner & Hu, P.C.

(57) ABSTRACT

In some embodiments, the invention involves extending trusted computing environments to the boot firmware. In at least one embodiment, the present invention is intended to enable the trusted environment to be extended forward to the pre-boot environment in addition to post-OS load environment. Embodiments of the present invention enable the trusted environment to extend to the firmware at power-on. The firmware is integrated within the secure perimeter which was previously only available to the OS. In other words, the BIOS is made to be a trusted entity, as well as the OS. Extensible firmware interface (EFI) modules are signed with a public key. The processor has an embedded private key. EFI modules are verified using the keys to ensure a trusted environment from boot to OS launch. Other embodiments are described and claimed.

18 Claims, 5 Drawing Sheets

SYSTEM AND METHOD FOR TRUSTED EARLY BOOT FLOW

FIELD OF THE INVENTION

An embodiment of the present invention relates generally to trusted computing environments and, more specifically, to extending the trusted environment to include the boot up and firmware services, as well as, the operating system.

BACKGROUND INFORMATION

Various mechanisms exist for ensuring that an operating system (OS) is trusted, as long as the OS is launched by another trusted environment. However, trusted operating system environments do not extend to the pre-boot environment and firmware services. Thus, hot plugging components and other firmware operations will typically require a re-boot of the system in order to ensure that the system is still operating in the trusted environment.

The Pentium® 4 processor, for instance, (a processor available from Intel Corporation) may now utilize security instructions called SMX (security management extension instructions). The SMX instructions allow the opportunity to associate a block of code with a signature and also have the ability to start up such signed code blocks in a secure environment. The signature may be signed using a key embedded securely in the processor. The secure machine instructions can securely use a block of digital code in the processor cache as a module. The secure machine instructions provide an environment where the signed digital code block can securely run in the environment without risk of modification. The instructions provide a tool so that if the signed digital code block is changed, the change will be detected and the operation can be aborted. The SMX instruction verifies the digitally signed code block using RSA with SHA (secure hash algorithm). A more complete description of RSA may be found on the public Internet at Uniform Resource Location (URL) www-rsasecurity-com/rsalabs/node.asp?id=2152. It should be noted that URLs identified in this document are modified to use hyphens instead of dots and to omit the http:// prefix to avoid inadvertent hyperlinks. A more complete description of SHA may be found at URL www-itl-nist-gov/fipspubs/fip180-1.htm.

A public key for the RSA verification is stored in the chipset hardware and a digital signature (signed hash) is stored in the binary module. In current systems, RSA and SHA-1 support in hardware may be found for main frame computers, but it has not been available on microprocessors. Very secure transmissions, for instance, for the military, have used these algorithms. The Pentium® 4 processor, for instance, now has this SHA available with the secure machine extension (SMX) architecture. These signed digital code blocks are also referred to as authenticated code modules (ACMs).

BRIEF DESCRIPTION OF THE DRAWINGS

The features and advantages of the present invention will become apparent from the following detailed description of the present invention in which.

DETAILED DESCRIPTION

Figure 1:
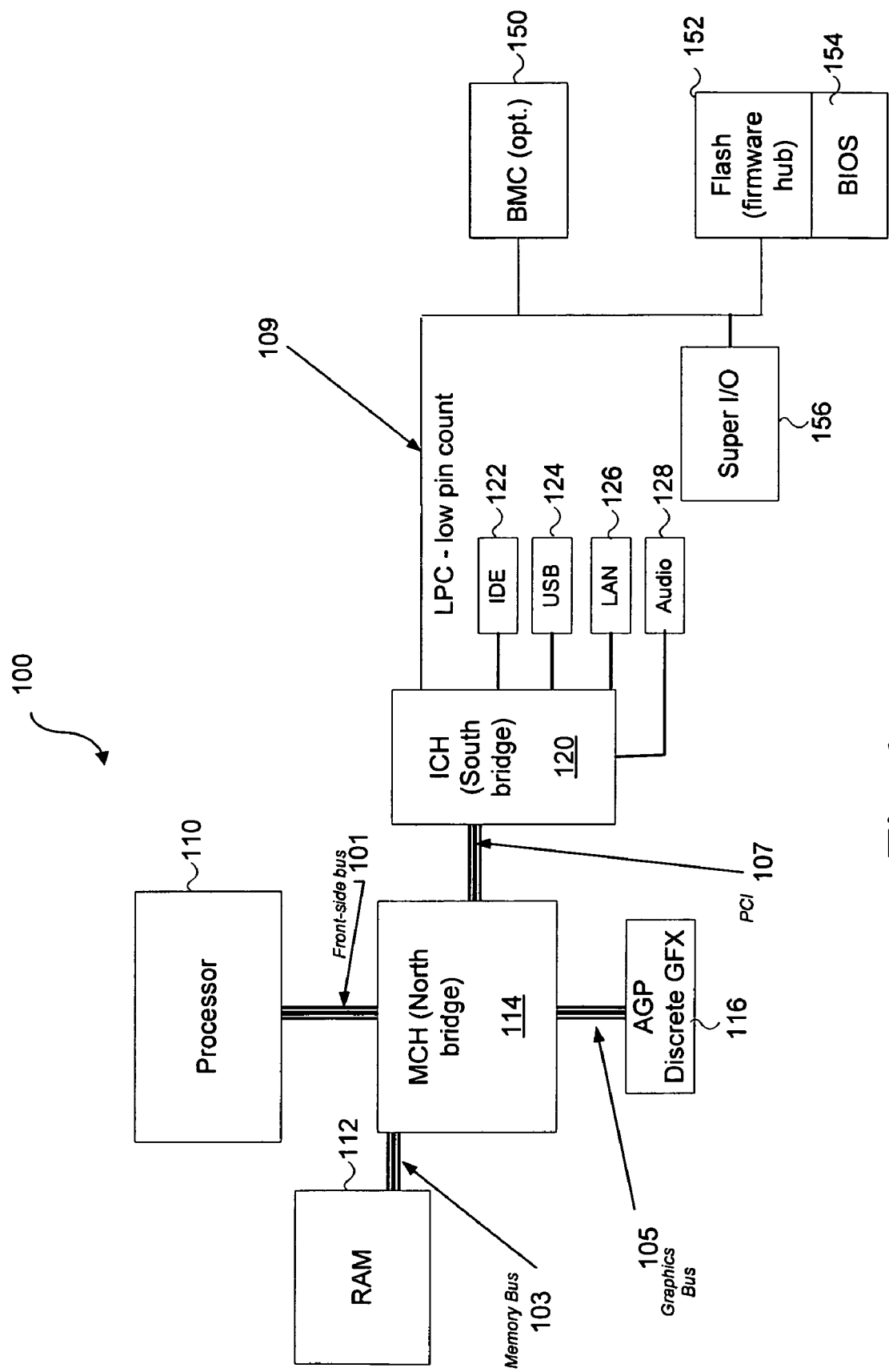
FIG. 1 is a block diagram of an exemplary environment which may be used to house an embodiment of the invention.

An embodiment of the present invention is a system and method relating to trusted computing environments. In at least one embodiment, the present invention is intended to enable the trusted environment to be extended forward to the pre-boot environment in addition to post-Operating system (post-OS) load environment. Embodiments of the present invention enable the trusted environment to extend to the firmware at power-on. The firmware is integrated within the secure perimeter which was previously only available to the OS. In other words, the BIOS is made to be a trusted entity, as well as the OS.

Reference in the specification to "one embodiment" or "an embodiment" of the present invention means that a particular feature, structure or characteristic described in connection with the embodiment is included in at least one embodiment of the present invention. Thus, the appearances of the phrase "in one embodiment" appearing in various places throughout the specification are not necessarily all referring to the same embodiment.

For purposes of explanation, specific configurations and details are set forth in order to provide a thorough understanding of the present invention. However, it will be apparent to one of ordinary skill in the art that embodiments of the present invention may be practiced without the specific details presented herein. Furthermore, well-known features may be omitted or simplified in order not to obscure the present invention. Various examples may be given throughout this description. These are merely descriptions of specific embodiments of the invention. The scope of the invention is not limited to the examples given.

Security management extension instructions (SMX) allow for a concept known as "late launch". Specifically, the conventional basic input output system (BIOS), operating system (OS) drivers, and other system software components, including the largely extant version of a shipping OS, can be untrusted. A security kernel that launches after the main OS is running may use the SMX architecture to establish a security perimeter (e.g., decrypting secrets, isolated memory and I/O) from the OS. The business motivation for the late launch is that performing a full security review of millions of lines of OS and BIOS code is economically untenable. Instead, this security kernel will be a small binary executable (perhaps 10K lines of source code) that uses the new SMX instructions of the Intel® processor to establish this secure operational mode. For instance, a SENTER command will have associated microcode in the processor that registers a hash of the security kernel with a fixed hardware token on the platform (e.g., Trusted Platform Module) in order to ensure that secrets are only revealed to the security kernel that stored these secrets. This new isolated mode of execution can be thought of as a "Ring-1", or even more privileged mode of execution beneath current ISA Ring's 0-4. SMX differs from virtualization, though, in that virtualization provides a mechanism for isolation but does not provide assurance that the same security kernel is always running (i.e., that the secrets are only stored/revealed to the same binary executable via above-listed SENTER hash-to-TPM mechanism). The use of SMX may be added to future versions of commercial, multi-user operating systems (e.g, Windows, Linux), because of the above-listed economic issues with source code review.

Once the OS is launched, the OS is secure. However, during runtime, the system may try to access basic input output system (BIOS) firmware code for some system level operations, particularly for hot plug operations. It is difficult to access firmware code and still ensure a trusted OS, since the firmware code block (BIOS) itself is not trusted. In this method of trusted OS launch, the BIOS is launched before the OS is verified, so BIOS code could be corrupt, or at least is considered an untrusted entity. In these systems, if the trusted OS has to run code from the pre-verification mode (or BIOS), then it will need to be relaunched to ensure trust again.

There are many operational features that depend on accessing the BIOS in system management mode. Hot plugging the processor requires BIOS code, so the newly added processor can be initialized. Hot plugging of memory requires firmware code for re-initialization. Since the firmware is not trusted, these type of system features are not possible to implement, or at least are very difficult to implement in this type of trusted OS environment.

The Extensible Firmware Interface (EFI) is a specification which defines a new model for the interface between operating systems and platform firmware, commonly known as Basic Input Output System (BIOS). The specification version 1.10, published Dec. 1, 2002, is available at the uniform resource location (URL) on the public Internet at developer-intel-com/technology/efi/main_specification.htm. The interface consists of data tables that contain platform-related information, plus boot and runtime service calls that are available to the operating system and its loader. Together, these provide a standard environment for booting an operating system and running pre-boot applications.

The EFI specification is primarily intended for the next generation of Intel® Architecture (IA) and Itanium® Architecture-based computers, and is an outgrowth of the "Intel Boot Initiative" (IBI) program that began in 1998. More information about EFI can be found at URL developer-intel-com/technology/efi/.

Legacy BIOS is tailored for a specific platform. EFI was developed to allow the operating system (OS) to operate generically and without communicating directly to the platform. EFI is effectively the middle layer between the OS and the platform. The layer beneath the EFI is implemented as BIOS, which is specific to the platform. The layer above EFI exposes the interface with which the OS communicates. When the system boots up and the OS assumes control, the OS is handed the EFI system table by the OS loader. The EFI system table is a data structure with pointers to other tables, or data structures. Some of these data structures contain a set of function pointers. The collections of functions pointed to by these tables are known as the runtime and boot services. Other data structures contain platform information such as the Advanced Configuration and Power Interface (ACPI) tables.

Embodiments of the present invention may be implemented using an implementation of the EFI specification known as the EFI "Framework." A more complete description of the EFI Framework may be found at URL www-intel-com/technology/framework. Embodiments of the present invention may also be implemented using a "Tiano" implementation of EFI. A more complete description of the Framework and Tiano implementations of EFI may be found at URLs www-intel-com/update/contents/it01043.htm and www-tianocore-org. In an EFI environment, the BIOS may be modularized.

Different modules initialize different components of the system. Each block or module of code is signed using a key. Each time a firmware module is accessed, an SMX instruction is used to launch a signed module of the firmware which is used to execute the appropriate instructions. Because the firmware is trusted, system management instructions may be accessed without having to re-initialize the system. In embodiments of the present invention, a machine starts up in secure mode, even before a secure OS is launched. Thus, the system continues to be trusted; the machine stays in a secure environment from pre-boot and through OS launch and runtime.

Planned secure operating systems where the firmware may not be trusted are suited for implementation of simple desktop machines. However, the application of secure operating systems on servers, for instance, requires operations that require the service of firmware modules after the secure OS has been booted in order to implement sophisticated server features like hot plugging of memory and processors without rebooting the machine. The rebooting is not an option when up-time is important and denial of service is not acceptable. In existing systems, for instance, hot plugging memory or other hardware would require the server to be brought down and then re-initialized to ensure the trusted environment.

For EFI, and specifically the Framework architectures, when the BIOS requires updates, over time, individual modules may be replaced. Each module is signed, so the security of the system is maintained from boot to OS launch.

Embodiments of this invention allow SMX (secure message extensions) to be used from the point where the BIOS is loaded, rather than from the point where the OS is launched.

FIG. 1 is a block diagram of an exemplary system 100 on which embodiments of the invention may be implemented. Processor 110 communicates with a memory controller hub (MCH) 114, also known as North bridge, via the front side bus 101. The MCH 114 communicates with system memory 112 via a memory bus 103. The MCH 114 may also communicate with an advanced graphics port (AGP) 116 via a graphics bus 105. The MCH 114 communicates with an I/O controller hub (ICH) 120, also known as South bridge, via a peripheral component interconnect (PCI) bus 107. The ICH 120 may be coupled to one or more components such as PCI hard drives (not shown), legacy components such as IDE 122, USB 124, LAN 126 and Audio 128, and a Super I/O (SIO) controller 156 via a low pin count (LPC) bus 156.

Processor 110 may be any type of processor capable of executing software, such as a microprocessor, digital signal processor, microcontroller, or the like. Though FIG. 1 shows only one such processor 110, there may be one or more processors in platform hardware 100 and one or more of the processors may include multiple threads, multiple cores, or the like.

Memory 112 may be a hard disk, a floppy disk, random access memory (RAM), read only memory (ROM), flash memory, or any other type of medium readable by processor 110. Memory 112 may store instructions for performing the execution of method embodiments of the present invention.

Non-volatile memory, such as Flash memory 152, may be coupled to the IO controller via a low pin count (LPC) bus 109. The BIOS firmware 154 typically resides in the Flash memory 152 and boot up will execute instructions from the Flash, or firmware.

In some embodiments, platform 100 is a server enabling server management tasks. This platform embodiment may have a baseboard management controller (BMC) 150 coupled to the ICH 120 via the LPC 109.

Figure 2:
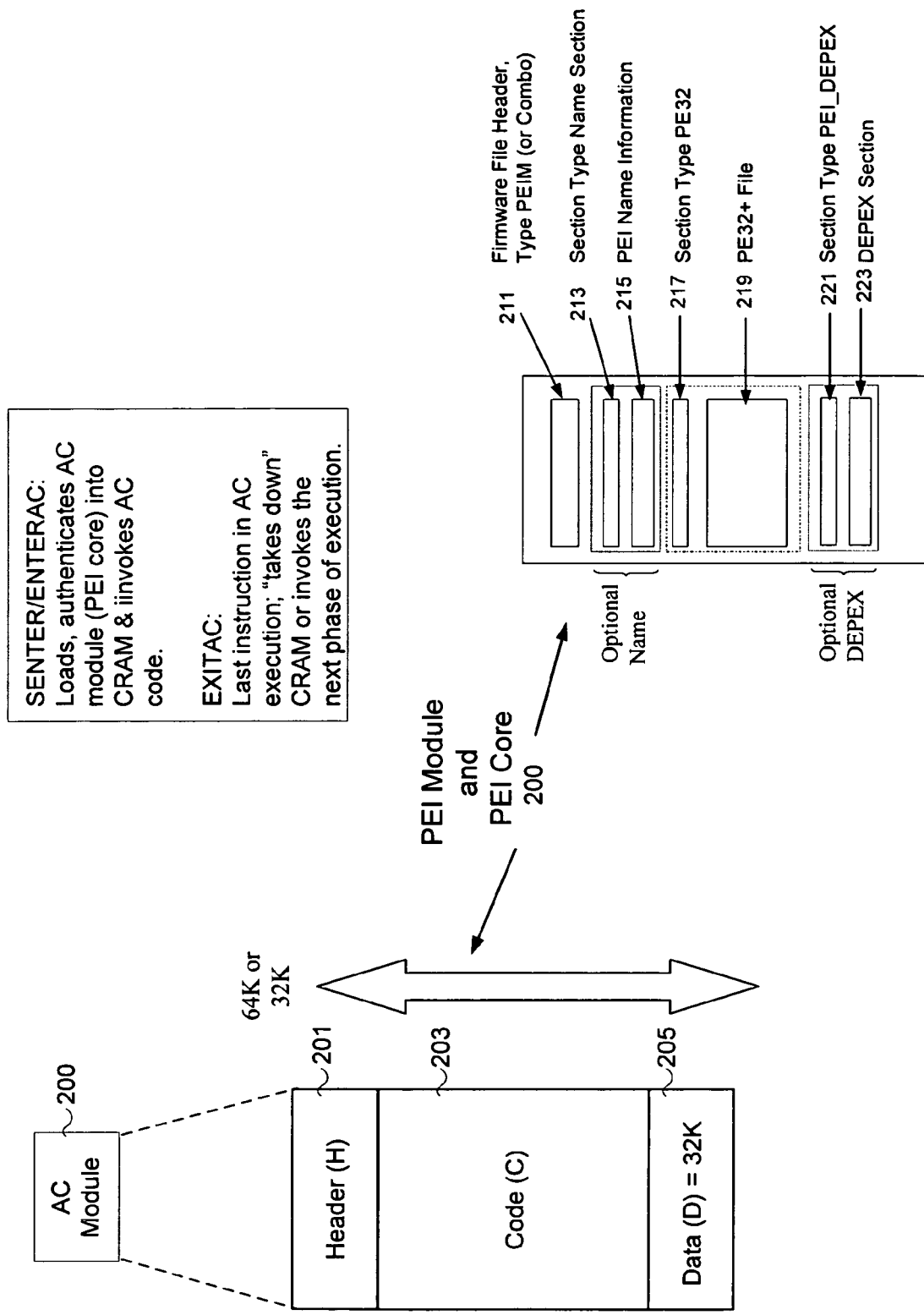
FIG. 2 is a block diagram showing an authenticated code module (AC module) according to an embodiment of the invention.

FIG. 2 illustrates a secure module format for BIOS modules according to an embodiment of the invention. The module is an authenticated code module (AC Module or ACM) 200 having header 201, code 203 and data portions 205. In the illustrative example, the AC module is 32K, but in some embodiments, the AC module may be 64K. The length of the AC code module depends on the SMX abilities of the underlying processor architecture. If the length of the AC module is larger than the SMX allowed size of a particular model of the processor, various software techniques may be used to overlay the code and execute the ACMs. The ACM 200 has a header 201 in particular format which must be understood by the microcode of the platform 100. The header 201 comprises information regarding the structure of the module. The module may be, for instance, a portable executable module type. The module 200 may further comprise a public key. The platform 100 may have a private key embedded in the processor 110. Using the keys together, the platform's microcode analyzes the module and verifies whether the module is secure or has been tampered with.

BIOS is typically divided into two parts in EFI. Pre-EFI initialization (PEI) core modules initialize hardware and the processor and memory. Before the memory may be initialized, the PEI Core is run.

In an embodiment, the PEI Core is run from cache as RAM (CRAM). Once memory is initialized and clean, then the code may execute in blocks larger than 64K.

In an embodiment, an ACM 200 may comprise a firmware file header 211, an optional name 215, a section type 213, a PE32+file 217 and 219, and an optional DEPEX section 221 and 223. PE32+file refers to a common image format known as the Portable Executable and Common Object File Format (PE/COFF), which is more fully described at URL www-cs-ucsb-edu/~nomed/docs/pecoff.html. DEPEX refers to a "dependency expression" syntax which is more fully described in the draft specification document "Intel Platform Innovation Framework for EFI, Pre-EFI Initialization Core Interface Specification (PEI CIS)" and found at URL www-intel-com/technology/framework/download. htm.

PEI core modules may be entered using the secure machine instructions (SMX). In an embodiment, SENTER and ENTERAC new instructions are to be added to the Instruction Set of the processor to enable the secure machine extensions. ENTERAC loads, authenticates and invokes the AC module 200 at the pre-EFI core (PEI core) into cache. In an embodiment, the cache is implemented as RAM and is referred to as cache as RAM (CRAM). In an embodiment, EXITAC is typically the last instruction in AC module execution. The EXITAC shuts down the CRAM or invokes the next phase of execution. However, if the microcode detects tampering, the AC module is not invoked, but an error message is sent to notify the system (or operator) that an error has occurred, and the initialization may be aborted.

Differences between SENTER and ENTERAC are related to single processor and multiple processor system implementations. SENTER is usually used in a multi-processor (MP) machine because it is capable of putting a processor into another state so that it does not affect the running module. One processor will be identified as the monarch processor (boot strap processor). SENTER puts all processors in sleep state before it allows the monarch processor to run code. Since only the secure processor is running during boot, no malicious code can be run by the other processors.

ENTERAC is a single processor version of SENTER instruction. ENTERAC performs a signature check of the ACM and starts up CRAM mode. SENTER may be a preferred implementation for secure firmware as it allows multi-processor implementations.

EXITAC exits secure firmware boot mode to DXE (driver execution environment) which precedes OS launch. The code may be written such that all the DXE code is checked and validated before EXITAC so that the machine can continue to operate in trusted environment.

A resource embodied within the processor hardware is required for running BIOS, or the BIOS becomes a security risk. In the illustrated embodiment, CRAM is the means for ensuring that the code that is running in this mode is not tampered with. It will be apparent to one of ordinary skill in the art that other methods may be used. For instance, RAM may be added onto the processor-die and may run the instructions of an ACM in this RAM. Embodiments of the present invention may utilize this RAM implementation, however, the RAM implementation may increase the costs of the processor.

Figure 3:
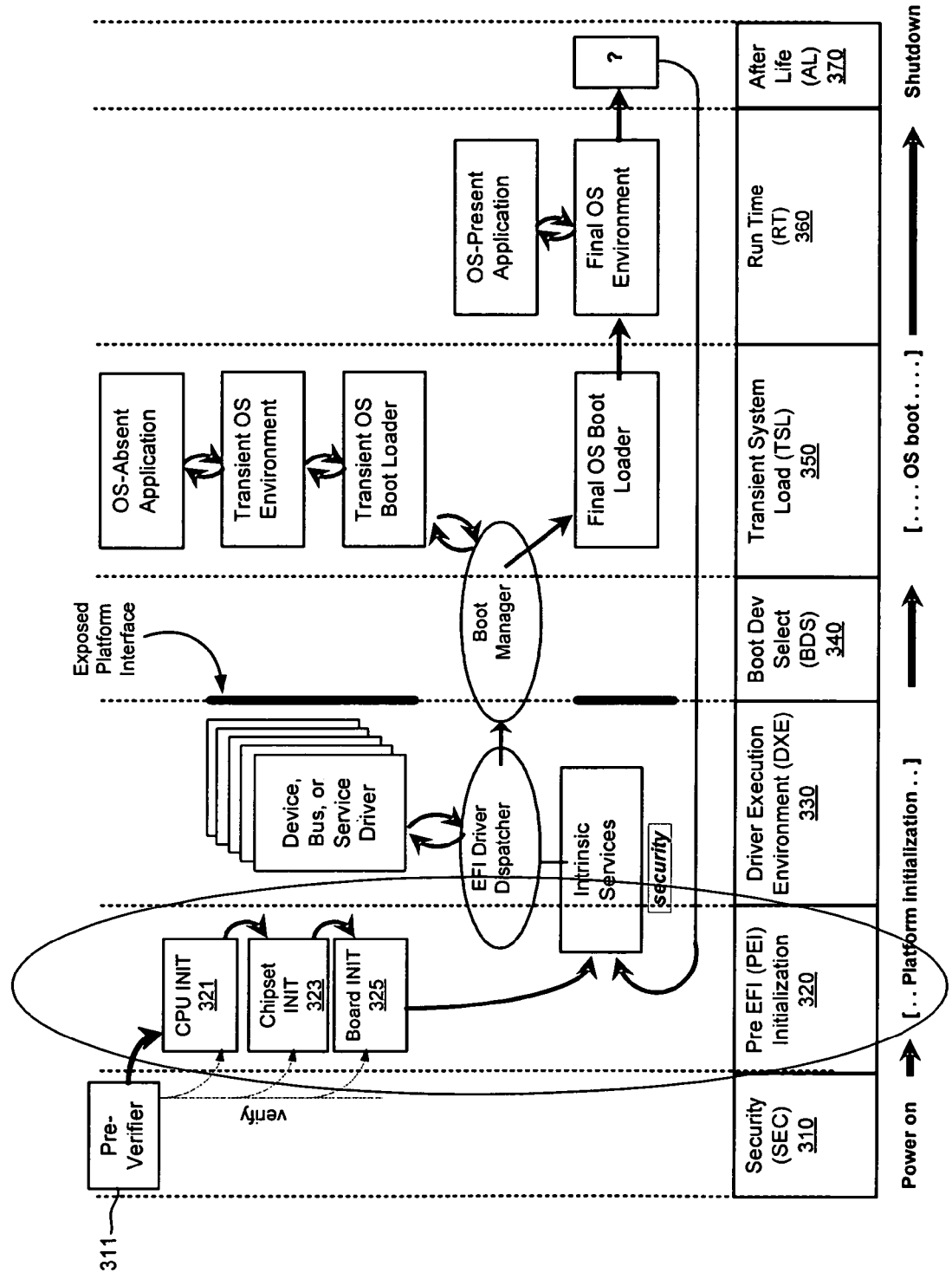
FIG. 3 illustrates the flow of execution of a system according to an embodiment of the invention.

FIG. 3 illustrates the flow of execution of a system according to an embodiment of the invention. A pre-verifier 311 may be run at power-on and the security (SEC) phase 310. A pre-verifier is typically another AC module that initializes and checks the environment. In existing systems, the pre-verifier and SEC phase is the Core Root of Trust for Measurement (CRTM), namely enough code to startup the Trusted Platform Module (TPM) and perform a hash-extend of BIOS. More information on TPMs may be found at URL www-trusted-computinggroup-org.

The processor 321, chipset 323 and board 325 may be initialized in the pre-EFI initialization (PEI) stage 320. After PEI, the EFI Driver Dispatcher and Intrinsic Services are launched securely in the driver execution environment (DXE) 330. The operations at the PEI phase 320 may be run from CRAM before EXITAC to DXE 330. The OS boots at the transient system load (TDL) stage 350.

The boot device select (BDS) phase 340 is responsible for choosing the appropriate operating system. Upon a system failure during OS runtime (RT phase 360), such as what is referred to as BSOD (Blue Screen Of Death) in Windows® or Panic in Unix/Linux, the firmware PEI and DXE flows may be reconstituted in an after life (AL phase 370) in order to allow OS-absent recovery activities.

Figure 4:
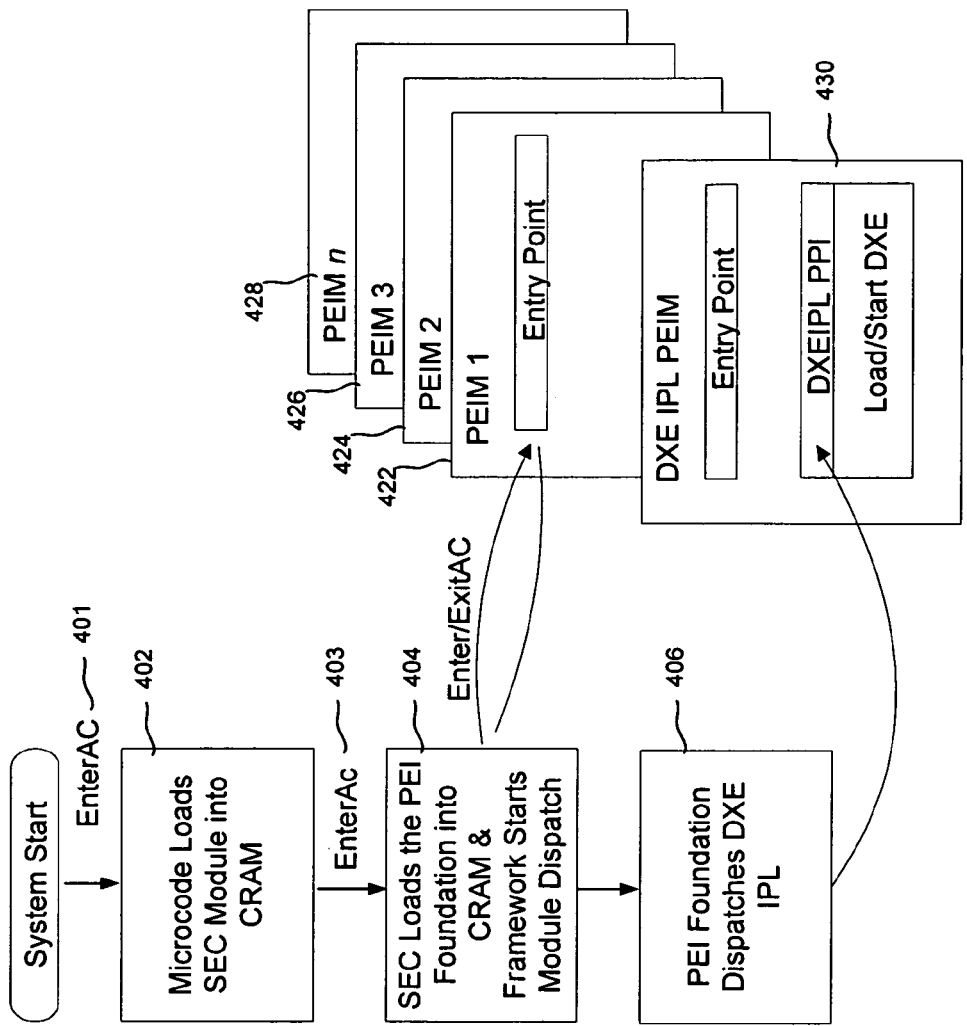
FIG. 4 is a flow diagram illustrating a method for pre-EFI (extensible firmware interface) initialization according to an embodiment of the invention.

FIG. 4 is a flow diagram illustrating a method for pre-EFI initialization (PEI) 320 according to an embodiment of the invention. When the system is started, an ENTERAC 401, or similar, command is executed. The processor microcode loads the SEC module into CRAM 402 at the pre-verify stage (FIG. 3, 311). The processor microcode is trusted, as it was delivered with the processor, and contains a private key. The microcode loads the first firmware module (Pre-verification module) 422 into CRAM and verifies that it is a trusted module using the keys. The pre-verify module executes the ENTERAC instruction 403 and subsequently loads all of the PEI modules 1 to n (422, 424, 426, 428) at 404. Each module may be loaded after another ENTERAC instruction. After memory has been initialized, the modules may be loaded into RAM rather than CRAM. Modules are exited using EXITAC, or similar, instruction. After the PEI modules are loaded and run, the DXE mode may be dispatched 406. The drivers may then be loaded in the DXE phase 430. Once the drivers are loaded the OS may be launched.

In one embodiment, a single module loads all of the subsequent modules. In another embodiment, successive modules load the next successive module. The ENTERAC instruction is executed prior to loading a PEI module. When each module completes, an EXITAC instruction is executed.

In the illustration, a dispatcher module is loaded first, which then loads each successive PEI module. In this embodiment, the first module may be started with a SENTER instruction and all the subsequent modules may be loaded and run using an ENTERAC and an EXITAC instruction.

The DXE may be executed in regular memory. The DXE automatically launches the boot manager for booting the OS.

Figure 5:
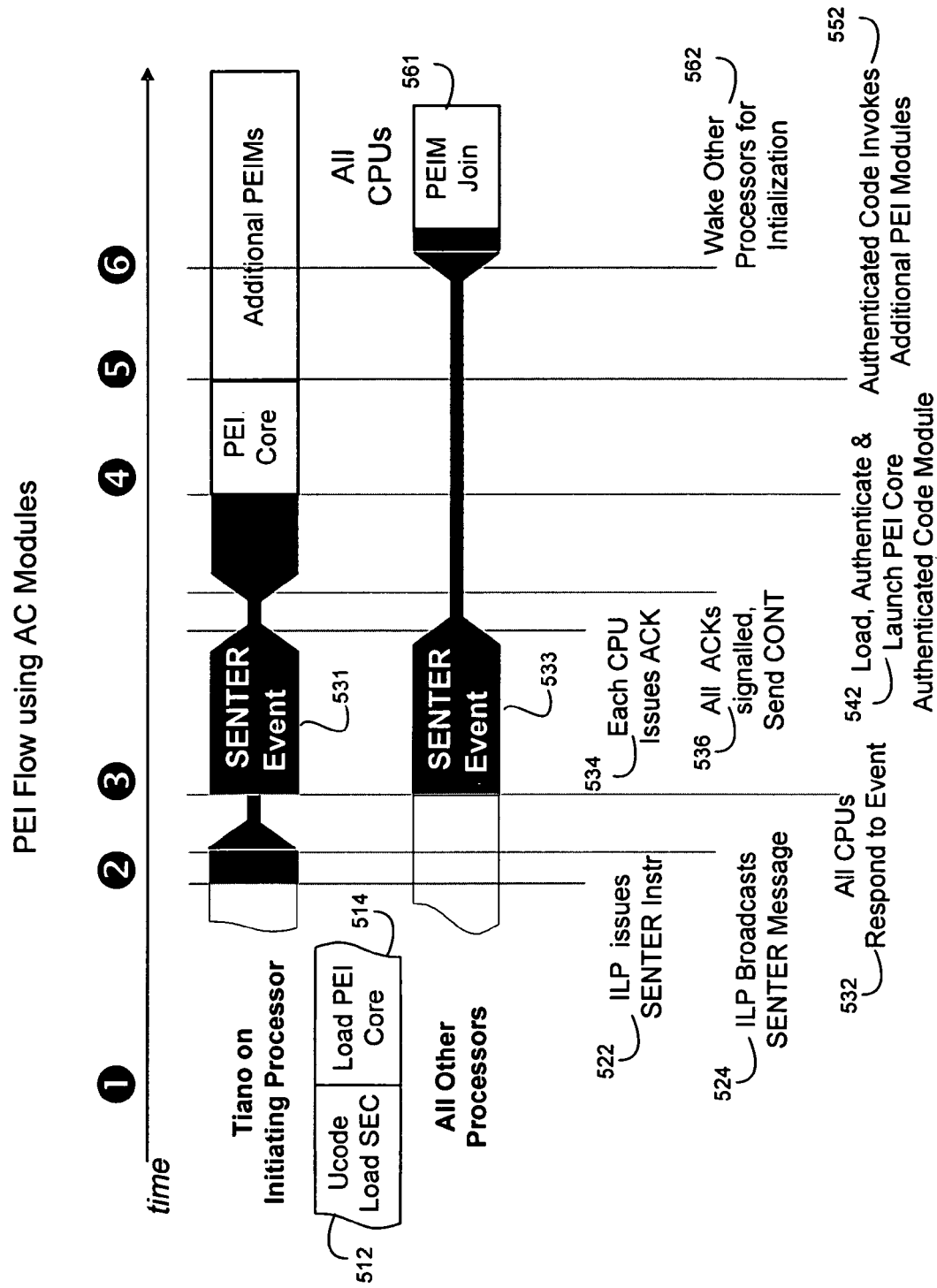
FIG. 5 illustrates a more detailed flow of instructions during pre-EFI initialization, according to an embodiment of the invention.

FIG. 5 illustrates a more detailed flow of instructions during pre-EFI initialization 320. In this embodiment a multiprocessor (MP) platform is shown. As defined, the ENTERAC is not sufficient for multi-processor platforms. In an MP platform, it is possible that one or more processors contain malicious code. Thus, the trusted system must safeguard against the other processors.

For MP platforms, a SENTER instruction is used to enter the secure module mode. In an MP platform, one processor initiates the security management. This monarch processor is known as the initiating logical processor (ILP).

In an embodiment, the microcode issues the ENTERAC/SENTER instruction and then launches the security (SEC) module 512. The PEI core is loaded in 514. In this MP embodiment, the ILP issues a SENTER instruction 522.

The ILP broadcasts the SENTER message to all processors in the MP platform 524. All processors on the platform, also known as responding logical processors (RLPs), respond to the SENTER event 532. Each RLP issues an acknowledgement (ACK) 534. Once all ACKs are signaled, a continue message (CONT) is sent by each RLP 536. The RLPs wait in a known state, or rendezvous point until the ILP's tasks are concluded. The RLPs send the CONT message to the ILP to indicate that they are successfully waiting at the rendezvous point.

The ILP knows how many processors (RLPs) are coupled to the system. Once all of the RLPs have acknowledged the SENTER, the PEI Core Authenticated Code Module is loaded, authenticated, and launched 542.

The authenticated code may invoke additional PEI modules 552.

Once PEI is completed, the RLPs are awakened for initialization 562. Since the PEI modules that perform this initialization are signed, the RLP initialization is secure. A PEIM Join operation 561 is performed. The RLPs are asked to wake up and join the code module (PEIM Join module). The RLPs also need to be initialized in a secure environment. One method of ensuring that the RLPs are trusted is for the ILP to authenticate the RLP initialization code and then wake up the RLP and run the authenticated code on this processor.

Although, embodiments of the present invention have been generally described using an EFI Framework based implementation, embodiments of the invention may also be practiced on a legacy BIOS that does not adhere to EFI 1.2 specifications. The legacy BIOS contains modules that initialize various hardware blocks of the system. These modules may be implemented with authenticated code modules. Once this is accomplished, these modules may be invoked in secure mode using Intel® SMX instructions (ENTERAC, SENTER, etc.) and executed in trusted mode. Any firmware module that initializes a block of hardware may be made to run in the secure environment by using this technique.

The techniques described herein are not limited to any particular hardware or software configuration; they may find applicability in any computing, consumer electronics, or processing environment. The techniques may be implemented in hardware, software, or a combination of the two. The techniques may be implemented in programs executing on programmable machines such as mobile or stationary computers, personal digital assistants, set top boxes, cellular telephones and pagers, consumer electronics devices (including DVD players, personal video recorders, personal video players, satellite receivers, stereo receivers, cable TV receivers), and other electronic devices, that may include a processor, a storage medium accessible by the processor (including volatile and non-volatile memory and/or storage elements), at least one input device, and one or more output devices. Program code is applied to the data entered using the input device to perform the functions described and to generate output information. The output information may be applied to one or more output devices. One of ordinary skill in the art may appreciate that the invention can be practiced with various system configurations, including multiprocessor systems, minicomputers, mainframe computers, independent consumer electronics devices, and the like. The invention may also be practiced in distributed computing environments where tasks or portions thereof may be performed by remote processing devices that are linked through a communications network.

Each program may be implemented in a high level procedural or object oriented programming language to communicate with a processing system. However, programs may be implemented in assembly or machine language, if desired. In any case, the language may be compiled or interpreted.

Program instructions may be used to cause a general-purpose or special-purpose processing system that is programmed with the instructions to perform the operations described herein. Alternatively, the operations may be performed by specific hardware components that contain hardwired logic for performing the operations, or by any combination of programmed computer components and custom hardware components. The methods described herein may be provided as a computer program product that may include a machine accessible medium having stored thereon instructions that may be used to program a processing system or other electronic device to perform the methods. The term "machine accessible medium" used herein shall include any medium that is capable of storing or encoding a sequence of instructions for execution by the machine and that cause the machine to perform any one of the methods described herein. The term "machine accessible medium" shall accordingly include, but not be limited to, solid-state memories, optical and magnetic disks, and a carrier wave that encodes a data signal. Furthermore, it is common in the art to speak of software, in one form or another (e.g., program, procedure, process, application, module, logic, and so on) as taking an action or causing a result. Such expressions are merely a shorthand way of stating the execution of the software by a processing system cause the processor to perform an action of produce a result.

While this invention has been described with reference to illustrative embodiments, this description is not intended to be construed in a limiting sense. Various modifications of the illustrative embodiments, as well as other embodiments of the invention, which are apparent to persons skilled in the art to which the invention pertains are deemed to lie within the spirit and scope of the invention.

What is claimed is:

1. A platform comprising:
a processor having a private key, the processor to communicatively couple to firmware comprising a first authenticated code (AC) module that includes a header, instruction code, data, and a public key,
wherein the public and private key allow (i) the first AC module to be trusted in execution during initialization prior to launch of an operating system, (ii) replacing a first hardware component, coupled to the platform, with a second hardware component via hot plugging after initialization of the platform; and (iii) authenticating and loading a second AC module, corresponding to the hot plugged component, without rebooting the platform,
wherein the processor architecture comprises an extensible firmware interface (EFI).

2. The platform as recited in claim 1, wherein the first AC module includes a firmware file header; an optional name; an image section; and an optional dependency expression section.

3. The platform as recited in claim 1, wherein the private key is embedded in the processor.

4. The platform as recited in claim 1, further comprising: processor microcode to load an AC module manager upon boot up, the AC module manager to load a pre-EFI (PEI) foundation and commence dispatch of one or more AC modules including the first AC module.

5. The platform as recited in claim 4, wherein the AC module manager is a security (SEC) module.

6. The platform as recited in claim 5, wherein the SEC module is to be loaded into cache as random access memory (CRAM), the cache to be coupled to the processor.

7. The platform as recited in claim 4, wherein a first security management extension (SMX) instruction is to be executed prior to loading the AC module manager, and wherein the first SMX instruction allows an AC module to be authenticated using the public and private keys.

8. The platform as recited in claim 7, wherein a second SMX instruction is to be executed by an AC module to allow execution to resume by the AC module manager or one of the one or more AC modules.

9. The platform as recited in claim 1, wherein platform initialization occurs during a pre-EFI (PEI) initialization stage of boot up, the pre-EFI initialization stage comprising initialization of the processor, platform chipset and platform motherboard, and wherein PEI comprises execution of one or more AC modules including the first AC module, the AC modules being authenticated by the public and private keys, and wherein PEI ensures a trusted environment through loading of a trusted operating system.

10. The platform as recited in claim 9, wherein the firmware services initialized during PEI are trusted by the trusted operating system.

11. A method for enabling a trusted environment in a platform comprising:
   authenticating a first authenticated code (AC) module, during initialization of a platform prior to launch of an operating system, using a private key embedded in a processor on the platform and a public key encoded within the first AC module, wherein the first authenticated AC module ensures trusted platform firmware services are available to a trusted operating system;
   loading the first authenticated AC module to perform an initialization task;
   replacing a first hardware component, coupled to the platform, with a second hardware component via hot plugging after initialization of the platform;
   authenticating and loading a second AC module, corresponding to the hot plugged component, without rebooting the platform; and
   initializing the hot plugged component without rebooting the platform; wherein the platform comprises an extensible firmware interface (EFI) architecture.

12. The method as recited in claim 11, wherein authenticating and loading of the first and second AC modules is allowed by security management extension (SMX) instructions implemented in the platform's instruction set architecture (ISA).

13. The method as recited in claim 12, further comprising:
   when the platform has multiple processors, issuing a first SMX instruction by an initiating logical processor (ILP) to suspend operations by one or more responding logical processors (RLPs);
   when the platform has multiple processors, responding by the RLPs to indicate that the issued SMX instruction has been acknowledged prior to loading authenticated AC modules;
   launching an authenticated and loaded AC module comprising a PEI core module;
   repeating the authenticating, loading and launching for successive AC modules until PEI initialization succeeds or fails;
   when PEI initialization succeeds, issuing a second SMX instruction by an initiating logical processor (ILP) to resume and join operations by the one or more RLPs; and
   when the PEI initialization fails, aborting boot up of the platform.

14. A non-transitory machine accessible medium having instructions that when executed cause the machine to:
   authenticate a first authenticated code (AC) module, during initialization of a platform prior to launch of an operating system, using a private key embedded in a processor on the machine and a public key encoded within the first AC module;
   load the first authenticated AC module to perform an initialization task,
   authenticate and load a second AC module without rebooting the platform, the second AC module corresponding to a second hardware component that is to replace a first hardware component, coupled to the platform, via a hot plug procedure to be performed after initialization of the platform;
   wherein the machine comprises an extensible firmware interface (EFI) architecture.

15. The machine accessible medium as recited in claim 14, wherein authenticating and loading of the one or more AC modules is enabled by security management extension (SMX) instructions implemented in the machine's instruction set architecture (ISA).

16. The machine accessible medium as recited in claim 15, further comprising instructions that when executed cause the machine to:
   when the platform has multiple processors, issue a first SMX instruction by an initiating logical processor (ILP) to suspend operations by one or more responding logical processors (RLPs);
   when the platform has multiple processors, respond by the RLPs to indicate that the issued SMX instruction has been acknowledged prior to loading authenticated AC modules;
   launch an authenticated and loaded AC module comprising a PEI core module;
   repeat the authenticating, loading and launching for successive AC modules until PEI initialization succeeds or fails;
   when PEI initialization succeeds, issue a second SMX instruction by an initiating logical processor (ILP) to resume and join operations by the one or more RLPs; and
   when the PEI initialization fails, abort boot up of the platform.

17. The method of claim 11 including replacing the first authenticated AC module with the second authenticated AC module.

18. The method of claim 11 including replacing the first authenticated AC module, which includes previously authenticated BIOS code, with the second authenticated AC module.

* * * * *